(12) United States Patent
Nakamura et al.

(10) Patent No.: US 9,947,912 B2
(45) Date of Patent: Apr. 17, 2018

(54) BUS BAR HOLDING MEMBER AND BATTERY PACK

(71) Applicants: TOYODA GOSEI CO., LTD., Kiyosu-shi, Aichen-ken (JP); TOYOTA JIDOSHA KABUSHIKI KAISHA, Toyota-shi, Aichi-ken (JP)

(72) Inventors: Yoshiki Nakamura, Kiyosu (JP); Yoshiaki Tatsumi, Kiyosu (JP); Yoshiaki Kameda, Kiyosu (JP); Nobuyoshi Fujiwara, Toyota (JP); Kenji Kimura, Miyoshi (JP)

(73) Assignees: TOYODA GOSEI CO., LTD., Aichi-pref. (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 144 days.

(21) Appl. No.: 14/478,310

(22) Filed: Sep. 5, 2014

(65) Prior Publication Data

US 2015/0072211 A1    Mar. 12, 2015

(30) Foreign Application Priority Data

Sep. 9, 2013  (JP) ................................. 2013-185928

(51) Int. Cl.
*H01M 2/20* (2006.01)
*H01M 2/10* (2006.01)

(52) U.S. Cl.
CPC ......... *H01M 2/206* (2013.01); *H01M 2/1077* (2013.01)

(58) Field of Classification Search
CPC ............................ H01M 2/1077; H01M 2/206
See application file for complete search history.

(56) References Cited

U.S. PATENT DOCUMENTS

| 2011/0223468 A1* | 9/2011 | Ferber, Jr. | ............. H01M 2/206 429/160 |
| 2011/0305936 A1* | 12/2011 | Kwag | ................... H01M 2/206 429/121 |
| 2012/0263995 A1* | 10/2012 | Naito | .................. H01M 2/1077 429/146 |

FOREIGN PATENT DOCUMENTS

| CN | 102195100 A | 9/2011 |
| JP | 2010-218797 A | 9/2010 |
| JP | 2010-282811 A | 12/2010 |

* cited by examiner

*Primary Examiner* — Milton I Cano
*Assistant Examiner* — Lingwen R Zeng
(74) *Attorney, Agent, or Firm* — Posz Law Group, PLC (57) ABSTRACT

A bus bar holding member comprises a plurality of bus bars arranged to connect terminals of respective batteries in each battery array group in parallel, and a resin support member comprising a resin stacking section which is stacked on a surface of the plurality of bus bars and a resin intervening section which intervenes between the plurality of bus bars to electrically insulate the plurality of bus bars from each other. The bus bar comprises a base plate on which the resin stacking section is stacked, and a jagged edge formed along an edge of the base plate. The jagged edge is formed in a wavy shape crossing a reference line, which is a straight line along an array direction of the batteries in each battery array group between an adjacent pair of the battery array groups.

11 Claims, 11 Drawing Sheets

Prior Art

Fig.16

Prior Art

BUS BAR HOLDING MEMBER AND BATTERY PACK

CROSS-REFERENCE TO RELATED APPLICATION

The present application claims the priority based on Japanese Patent Application No. 2013-185928 filed on Sep. 9, 2013, the disclosure of which is hereby incorporated by reference in its entirety.

BACKGROUND

Technical Field

The present invention relates to a bus bar holding member used to connect a plurality of battery terminals with one another, as well as to a battery pack.

Related Art

A technique disclosed in JP 2010-282811A has been known with respect to a battery pack. The battery pack is configured to connect a plurality of cylindrical batteries in parallel or in series and includes: battery array groups, each having an array of a plurality of cylindrical batteries; bus bars arranged to electrically connect the plurality of batteries and the battery array groups; and an insulating outer shell member configured to hold the bus bars and prevent a short circuit between the bus bars. In this battery pack, the insulating outer shell member is provided as a separate member from the bus bars and is assembled with the bus bars.

A battery pack using a metal member-incorporating based plate has been known as another prior art technique (JP 2010-218797A). The metal member-incorporating base plate has a plurality of bus bars as insert members embedded in a resin material during injection molding. This provides insulation and facilitates assembling.

The technique disclosed in JP 2010-282811A, however, has the following problems. The insulating outer shell member is used to provide insulation between the bus bars and prevent a short circuit between the bus bar and the outside. This insulating outer shell member is provided as a separate member from the bus bars and accordingly needs complicated assembling. The insulating outer shell member has ribs in a cylindrical shape to increase the insulating distance. This undesirably increases the dimension of the insulating outer shell member in the thickness direction.

The technique disclosed in JP 2010-218797A, on the other hand, has the following problem. The metal (bus bars) and the resin (resin member) have significantly different thermal contractions during injection molding. A large stress is accordingly generated in an area which is between the bus bars and is made of only the resin material during cooling and solidification after injection molding. The metal member-incorporating base plate is thus undesirably likely to have bending deformation from this area as the starting point.

SUMMARY

According to one aspect of the invention, there is provided a bus bar holding member configured to connect terminals of respective batteries included in a battery unit in parallel and in series, wherein the battery unit comprises a plurality of battery array groups, each including a plurality of batteries arrayed in an array direction. The bus bar holding member comprises: a plurality of bus bars arranged to connect the terminals of the batteries in each battery array group in parallel; and a resin support member including a resin stacking section which is stacked on at least one surface of the plurality of bus bars, and a resin intervening section which intervenes between the plurality of bus bars to electrically insulate the plurality of bus bars from each other. The bus bar comprises a base plate on which the resin stacking section is stacked, and a jagged edge formed along an edge of the base plate. The jagged edge is formed in a wavy shape crossing a reference line, which is a straight line along the array direction between an adjacent pair of the battery array groups.

DETAILED DESCRIPTION (1) General Configuration of Battery Pack

Figure 1:
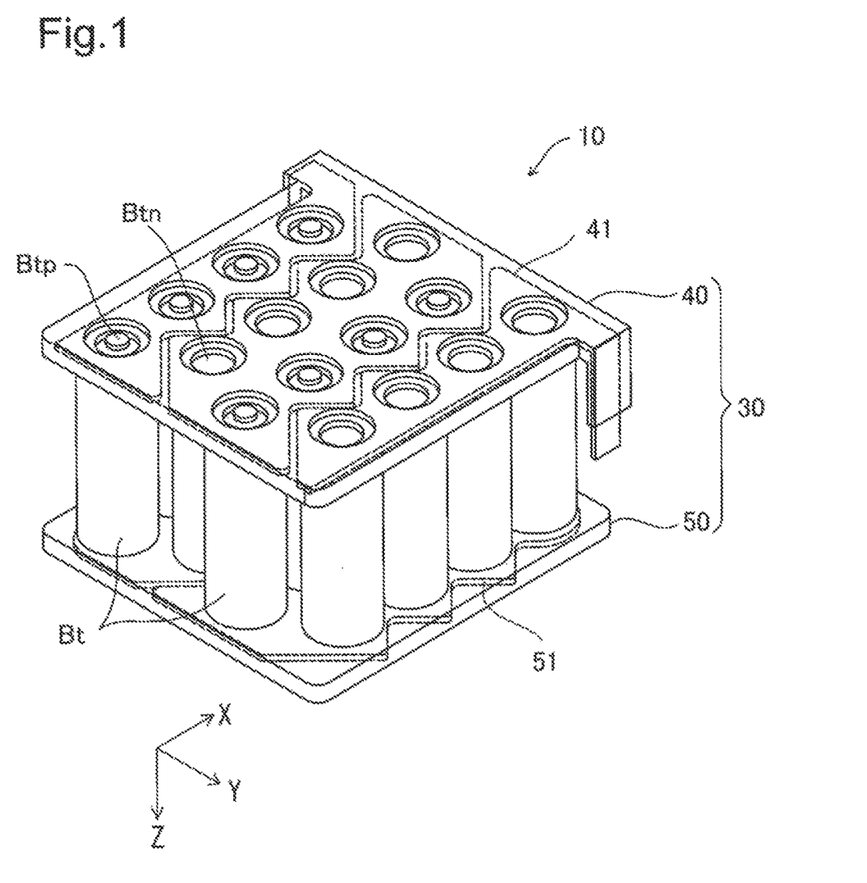
FIG. 1 is a perspective view illustrating a battery pack where a plurality of batteries are held according to one embodiment of the invention.
Figure 2:
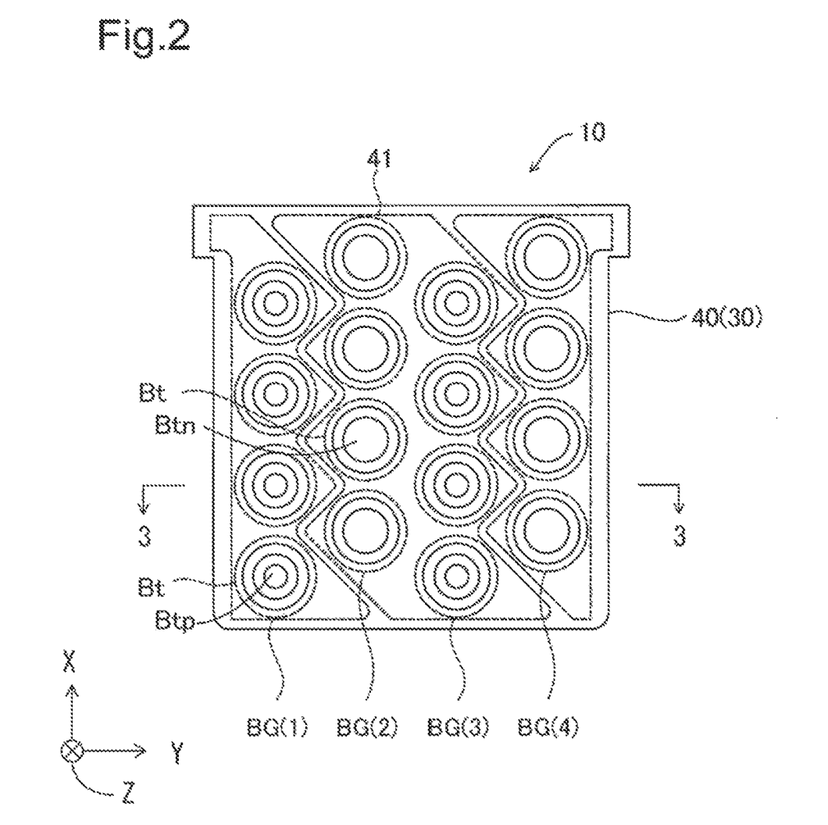
FIG. 2 is a plan view illustrating the battery pack of FIG. 1.
Figure 3:
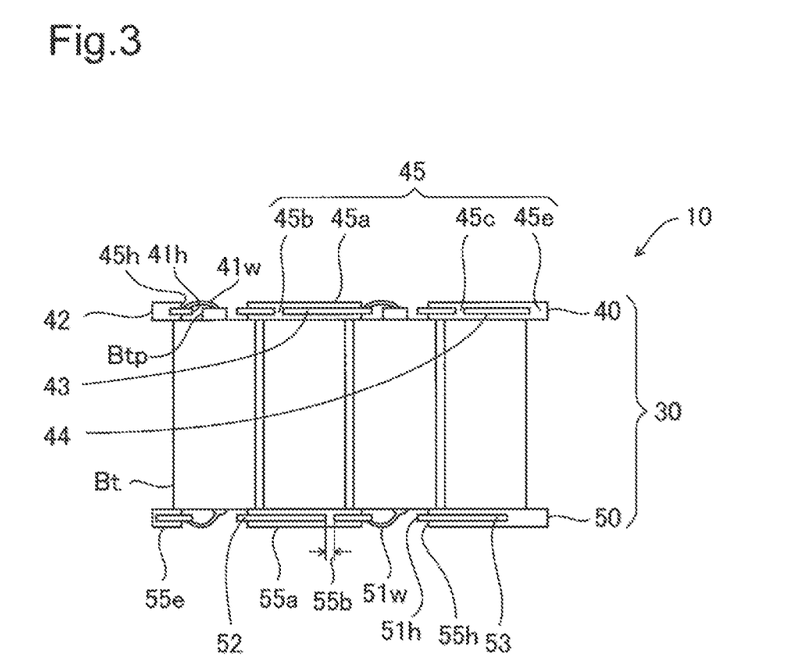
FIG. 3 is a cross sectional view taken on a line 3-3 in FIG. 2.

FIG. 1 is a perspective view illustrating a battery pack 10 where a plurality of batteries Bt are held according to one embodiment of the invention. FIG. 2 is a plan view illustrating the battery pack 10 of FIG. 1. FIG. 3 is a cross sectional view taken on a line 3-3 in FIG. 2. The battery pack 10 includes bus bar holding members 30, which are arranged on both ends of the respective batteries Bt to connect the batteries Bt in parallel and in series and thereby supply electricity to an external terminal. The bus bar holding members 30 include a first bus bar holding member 40 located on the upper side of the batteries Bt (in illustration) and a second bus bar holding member 50 located on the lower side of the batteries Bt (in illustration). The batteries Bt are cylindrical general-purpose batteries and may be, for example, lithium ion batteries used as a power source for automobile.

XYZ axes orthogonal to one another are shown in FIG. 1. The X-axis direction is also called array direction of batteries. The Y-axis direction is a direction orthogonal to the array direction. The Z-axis direction is a direction parallel to the side faces of the batteries and is also called axial direction of the batteries.

(2) Structures of Respective Components of Battery Pack 10

When a plurality of batteries are arrayed in the X-axis direction as shown in FIG. 2, the combination of these batteries is called a battery array group. As illustrated, four battery array groups are arranged in the X-axis direction. In the description below, these battery array groups are expressed as BG(1), BG(2), BG(3) and BG(4) sequentially from the left side in illustration. The number of battery array groups is not limited to four but may be any number of battery array groups as long as that does not interfere with the functions or the advantageous effects of the embodiment. In the description below, the suffixes (1), (2), (3) and (4) attached to the symbols representing certain members are used to indicate the certain members corresponding to the respective battery array groups.

Figure 4:
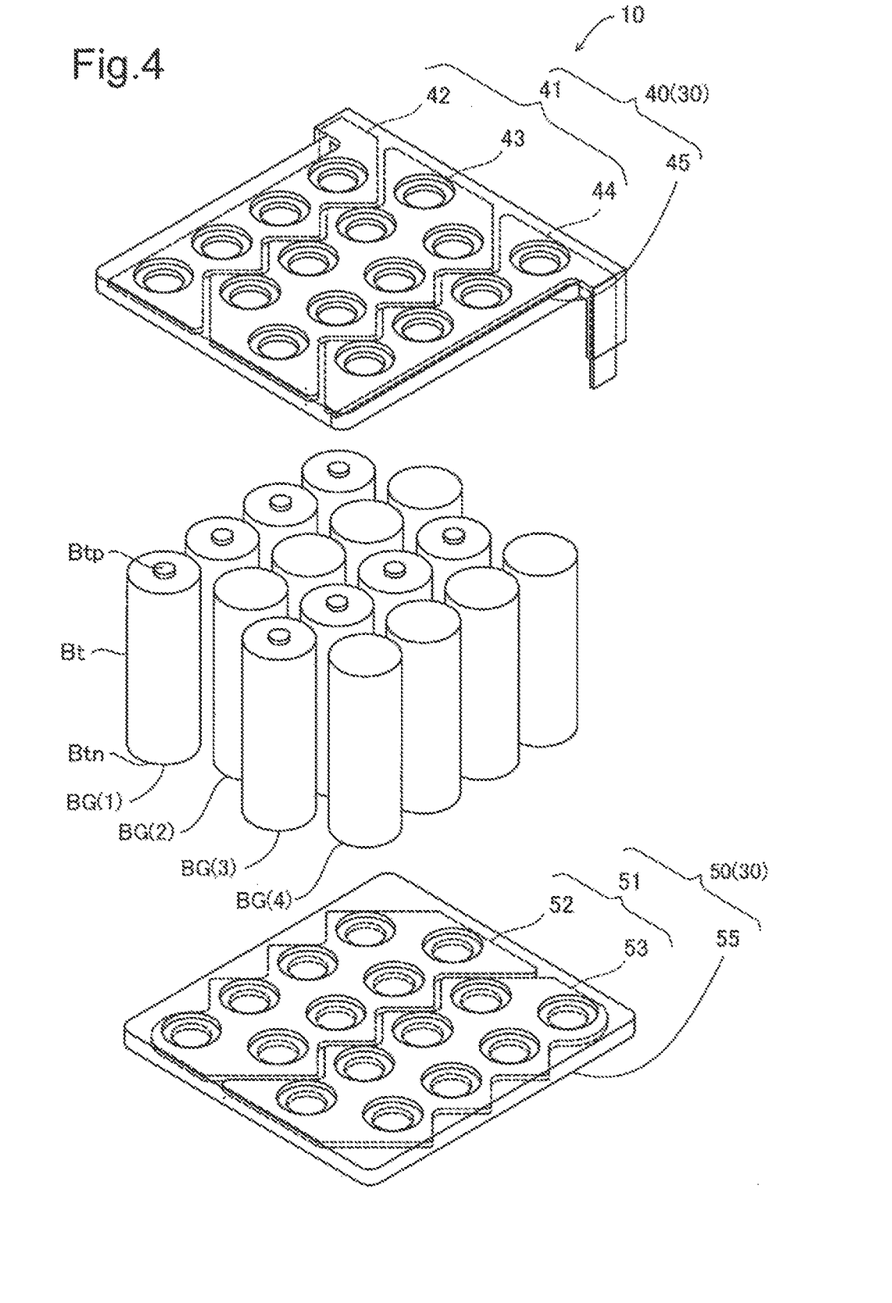
FIG. 4 is an exploded perspective view of the battery pack.

FIG. 4 is an exploded perspective view of the battery pack 10. Referring to FIG. 4, the first bus bar holding member 40 and the second bus bar holding member 50 of the bus bar holding members 30 are shown separately in the axial direction from the batteries Bt. Each of the batteries Bt is a battery in a cylindrical shape and has a positive terminal Btp formed on one end and a negative terminal Btn formed on the other end. The directions of the respective batteries Bt are reversed in the vertical direction in illustration on every other battery array group BG. In other words, the positive terminals Btp face upward in the battery array groups BG(1) and BG(3), whereas the negative terminals Btn face upward in the battery array groups BG(2) and B(4).

Figure 5:
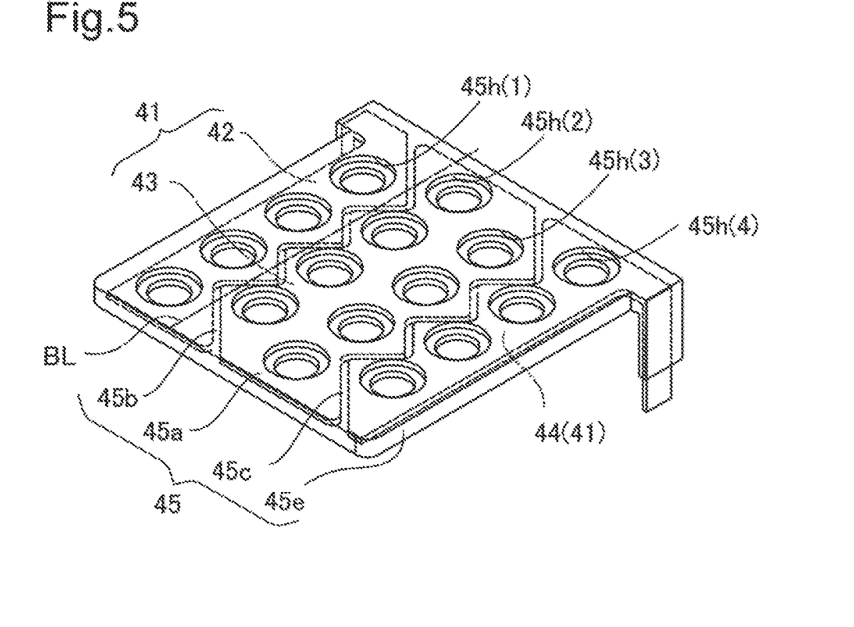
FIG. 5 is a perspective view illustrating a first bus bar holding member.

FIG. 5 is a perspective view illustrating the first bus bar holding member 40. The first bus bar holding member 40 is configured by embedding a plurality of bus bars 41 made of a thin metal plate in a resin support member 45 made of a resin material by insert molding.

Figure 6:
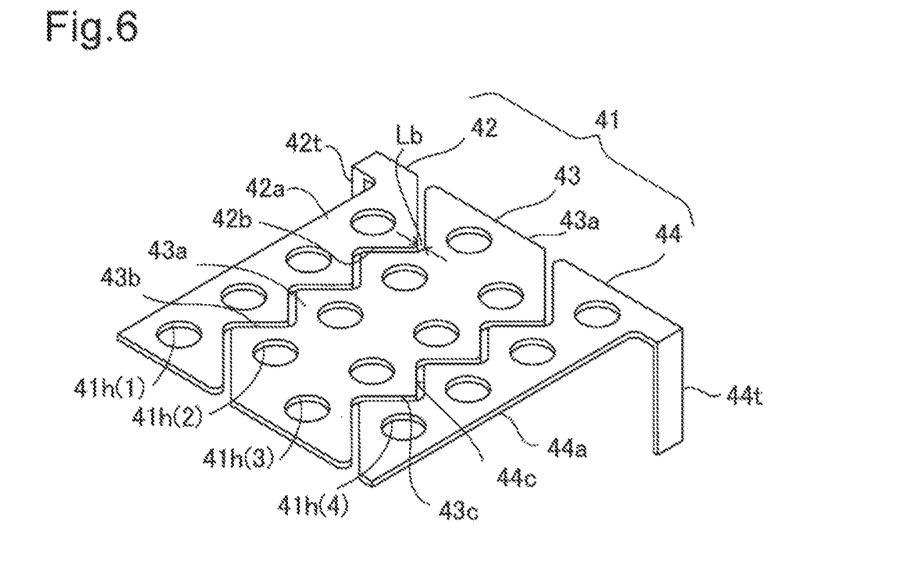
FIG. 6 is a perspective view illustrating bus bars.

FIG. 6 is a perspective view illustrating the bus bars 41. The bus bars 41 include a positive bus bar 42, a coupling bus bar 43 and a negative bus bar 44 and is formed by pressing a thin metal plate. The thickness of the bus bars 41 is 0.4 to 1.2 mm.

The positive bus bar 42 is a plate material arranged to connect the positive terminals Btp of the four batteries Bt in the battery array group BG(1) in parallel as shown in FIG. 2 and includes a thin base plate 42a and an external terminal 42t formed on one end of the base plate 42a. The base plate 42a has four terminal openings 41h(1) formed therein. The four terminal openings 41h(1) are circular holes of an identical inner diameter and are formed along the battery array group BG(1) and corresponding to the four batteries Bt. The base plate 42a also has a jagged edge 42b formed along one side edge of the base plate 42a. The jagged edge 42b is formed in the array direction of the battery array group BG(1) in a zigzag shape to surround part of the side faces of the respective batteries Bt.

The external terminal 42t is formed to be bent from the end of the base plate 42a at the right angle, i.e., in the axial direction, and is connected with an outside terminal (not shown) to extract the electric power output from the battery pack 10.

The coupling bus bar 43 is a plate material arranged to connect the negative terminals Btn of the four batteries Bt in the battery array group BG(2) in parallel, to connect the positive terminals Btp of the four batteries Bt in the battery array group BG(3) in parallel and to connect the batteries Bt in the battery array group BG(2) in series with the batteries Bt in the battery array group BG(3) as shown in FIG. 2.

The coupling bus bar 43 has a thin base plate 43a. The base plate 43a has eight terminal openings 41h(2) and 42h(3) formed in the same shape as that of the terminal openings 41h(1) of the positive bus bar 42. The four terminal openings 41h(2) are arranged along the battery array group BG(2), and the four terminal openings 41h(3) are arranged along the battery array group BG(3).

The base plate 43a also has jagged edges 43b and 43c formed along two side edges of the base plate 43a. The jagged edge 43b is arranged along the array direction of the battery array group BG(2) and at a predetermined distance Lb from the jagged edge 42b of the positive bus bar 42 and is formed in a zigzag shape to surround part of the side faces of the respective batteries Bt. The jagged edge 43c is arranged along the array direction of the battery array group BG(3) and is formed in a zigzag shape to surround part of the side faces of the respective batteries Bt.

The negative bus bar 44 is a plate material arranged to connect the negative terminals Btn of the four batteries Bt in the battery array group BG(4) in parallel as shown in FIG. 2 and includes a thin base plate 44a and an external terminal 44t formed on one end of the base plate 44a. The base plate 44a has four terminal openings 41h(4) formed therein. The four terminal openings 41h(4) are circular holes of an identical inner diameter and are formed along the battery array group BG(4) and corresponding to the four batteries Bt. The base plate 44a also has a jagged edge 44c formed along one side edge of the base plate 44a. The jagged edge 44c is formed in the array direction of the battery array group BG(4) in a zigzag shape to surround part of the side faces of the respective batteries Bt.

The external terminal 44t is formed to be bent from the end of the base plate 44a at the right angle, i.e., in the axial direction, and is connected with an outside terminal (not shown) to extract the electric power output from the battery pack 10.

Referring to FIG. 5, the resin support member 45 has the positive bus bar 42, the coupling bus bar 43 and the negative bus bar 44 embedded in a resin material, such as to ensure the electrical insulation between the plurality of bus bars and hold the plurality of bus bars flush with each other. The resin material of the resin support member 45 may be a polyester-based resin or a polyester-based elastomer, for example, polybutylene terephthalate (PBT) or PBT-based polyester elastomer.

Figure 7:
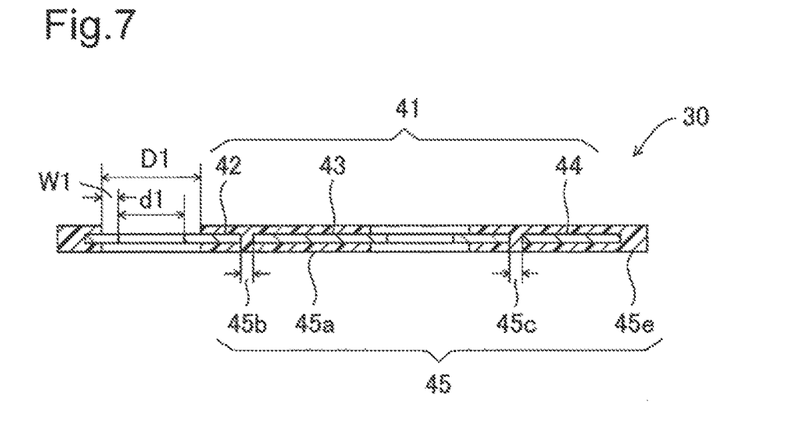
FIG. 7 is a cross sectional view illustrating the first bus bar holding member.
Figure 8:
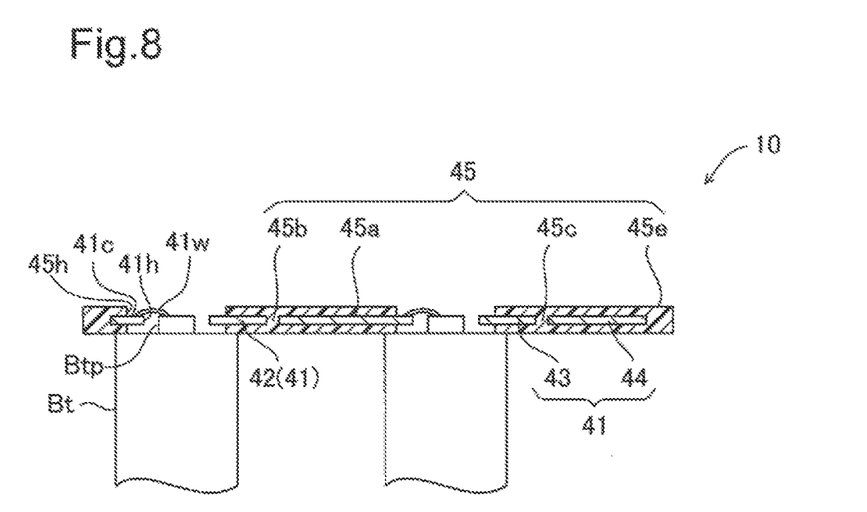
FIG. 8 is a cross sectional view illustrating an upper portion of the battery pack.

The resin support member 45 has a plurality of resin openings 45h formed therein. The respective resin openings 45h are formed concentrically with the corresponding terminal openings 41h of the bus bars 41. FIG. 7 is a cross sectional view illustrating the first bus bar holding member 40. Referring to FIG. 7, the first bus bar holding member 40 has the relationship of d1<D1 where d1 represents the inner diameter of the terminal openings 41h and D1 represents the inner diameter of the resin openings 45h. Since the resin opening 45h is larger than the terminal opening 41h, the opening periphery of the terminal opening 41h forms an electrical connection 41c exposed outside as shown in FIG. 8. The electrical connection 41c is connected with either the positive terminal Btp or the negative terminal Btn of the battery Bt via a wiring 41w by wire bonding.

Figure 9:
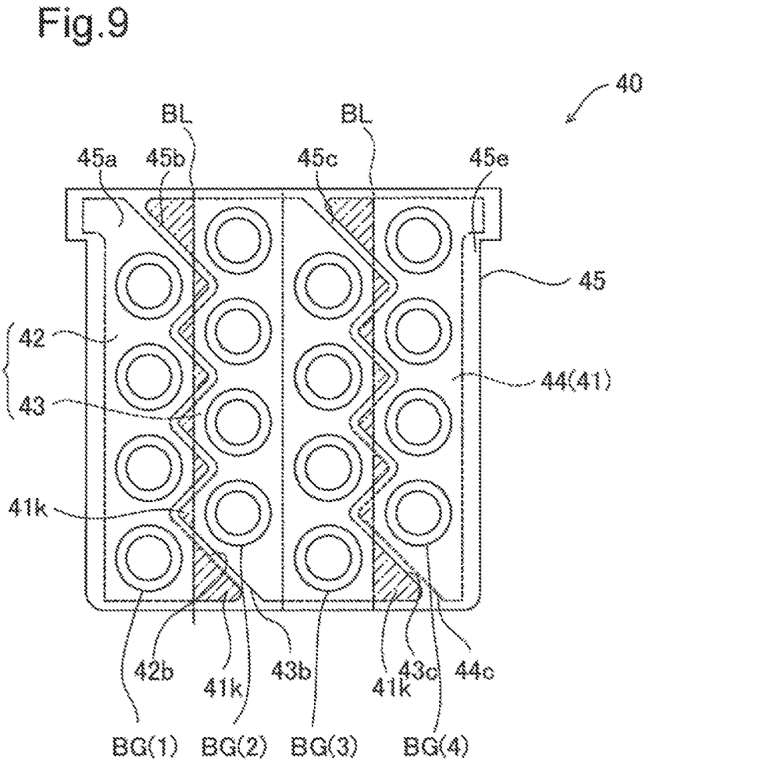
FIG. 9 is a diagram illustrating the first bus bar holding member.

FIG. 9 is a diagram illustrating the first bus bar holding member 40. The resin support member 45 is an integral resin member but is virtually divided, relative to the respective parts of the bus bars 41, into a resin stacking section 45a, a resin intervening section 45b, a resin intervening section 45c and a resin peripheral section 45e arranged to surround the outer periphery of the bus bars 41.

The resin stacking section 45a is stacked on part of the upper surface of the bus bars 41 (surface on the side opposite to the batteries) and part of the lower surface of the bus bars 41 (surface on the side of the batteries). The resin intervening section 45b intervenes between the jagged edge 42b of the positive bus bar 42 and the jagged edge 43h of the coupling bus bar 43 and is made of only the resin material in a wavy pattern of a predetermined width. When a reference line BL is drawn in the array direction between the battery array group BG(1) and the battery array group BG(2), the resin intervening section 45b is formed along a jagged line crossing the reference line BL and is thus formed to serpentine about the reference line BL.

Part of the jagged edge 42b of the positive bus bar 42 and part of the jagged edge 43b of the coupling bus bar 43 form protruded areas 41k crossing the reference line BL.

Like the resin intervening section 45b, the resin intervening section 45c intervenes between the jagged edge 43c of the coupling bus bar 43 and the jagged edge 44c of the negative bus bar 44 and is made of only the resin material in a wavy pattern of a predetermined width. When a reference line BL is drawn in the array direction between the battery array group BG(3) and the battery array group BG(4), the resin intervening section 45c is formed along a jagged line crossing the reference line BL. Part of the jagged edge 43c of the coupling bus bar 43 and part of the jagged edge 44c of the negative bus bar 44 form protruded areas 41k crossing the reference line BL.

Figure 10:
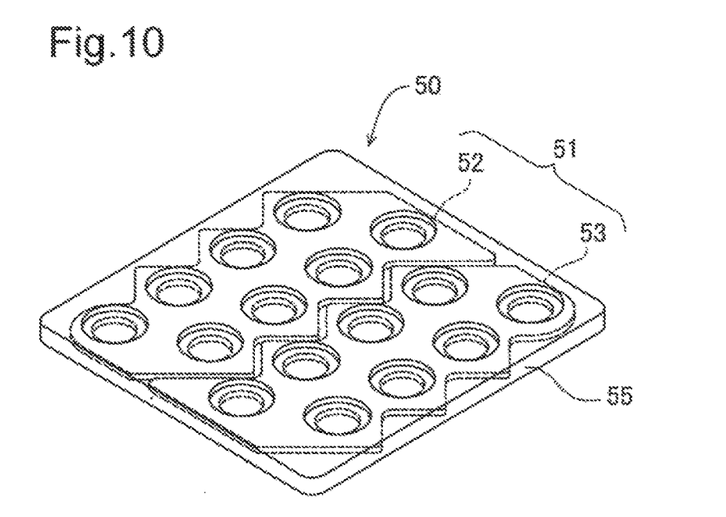
FIG. 10 is a perspective view illustrating a second bus bar holding member.

FIG. 10 is a perspective view illustrating the second bus bar holding member 50. The second bus bar holding member 50 is configured by embedding a plurality of bus bars 51 made of a thin metal plate in a resin support member 55 made of a resin material by insert molding.

Figure 11:
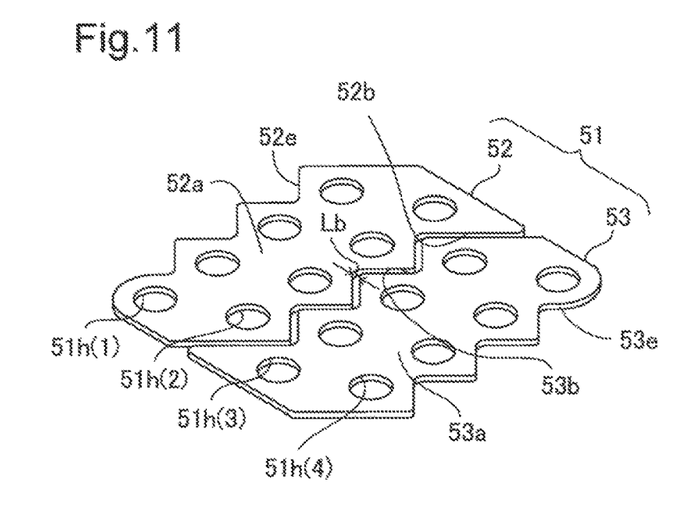
FIG. 11 is a perspective view illustrating bus bars.

FIG. 11 is a perspective view illustrating the bus bars 51. The bus bars 51 include coupling bus bars 52 and 53 and is formed by pressing a thin metal plate, like the bus bars 41. The coupling bus bar 52 is a plate material arranged to connect the negative terminals Btn of the four batteries Bt in the battery array group BG(1) in parallel, to connect the positive terminals Btp of the four batteries Bt in the battery array group BG(2) in parallel and to connect the batteries Bt in the battery array group BG(1) in series with the batteries Bt in the battery array group BG(2) as shown in FIG. 2.

The coupling bus bar 52 has a thin base plate 52a. The base plate 52a has eight terminal openings 51h(1) and 51h(2) formed therein. The four terminal openings 51h(1) are arrayed along the battery array group BG(1), and the four terminal openings 51h(2) are arrayed along the battery array group BG(2). The base plate 52a also has jagged edges 52b and 52e formed along two side edges of the base plate 52a. The jagged edges 52b and 52e are formed on the respective edges of the base plate 52a along the array direction of the battery array groups BG.

The coupling bus bar 53 is a plate material arranged to connect the negative terminals Btn of the four batteries Bt in the battery array group BG(3) in parallel, to connect the positive terminals Btp of the four batteries Bt in the battery array group BG(4) in parallel and to connect the batteries Bt in the battery array group BG(3) in series with the batteries Bt in the battery array group BG(4) as shown in FIG. 2.

The coupling bus bar 53 has the similar structure to that of the coupling bus bar 52 and has a thin base plate 53a. The base plate 53a has eight terminal openings 51h(3) and 51h(4) formed therein. The four terminal openings 51h(3) are arrayed along the battery array group BG(3), and the four terminal openings 51h(4) are arrayed along the battery array group BG(4). The base plate 53a also has jagged edges 53b and 53e formed along two side edges of the base plate 53a. The jagged edges 53b and 53e are formed on the respective edges of the base plate 53a along the array direction of the battery array groups BG.

The jagged edge 52b of the coupling bus bar 52 and the jagged edge 53b of the coupling bus bar 53 are arranged across a predetermined distance Lb and are respectively formed in a zigzag shape to surround part of the side faces of the respective batteries Bt.

Referring to FIG. 10, the resin support member 55 has the similar structure to that of the resin support member 45 and has the coupling bus bars 52 and 53 of the bus bars 51 embedded in a resin material, such as to ensure the electrical insulation between the plurality of bus bars and hole the plurality of bus bars flush with each other.

Figure 12:
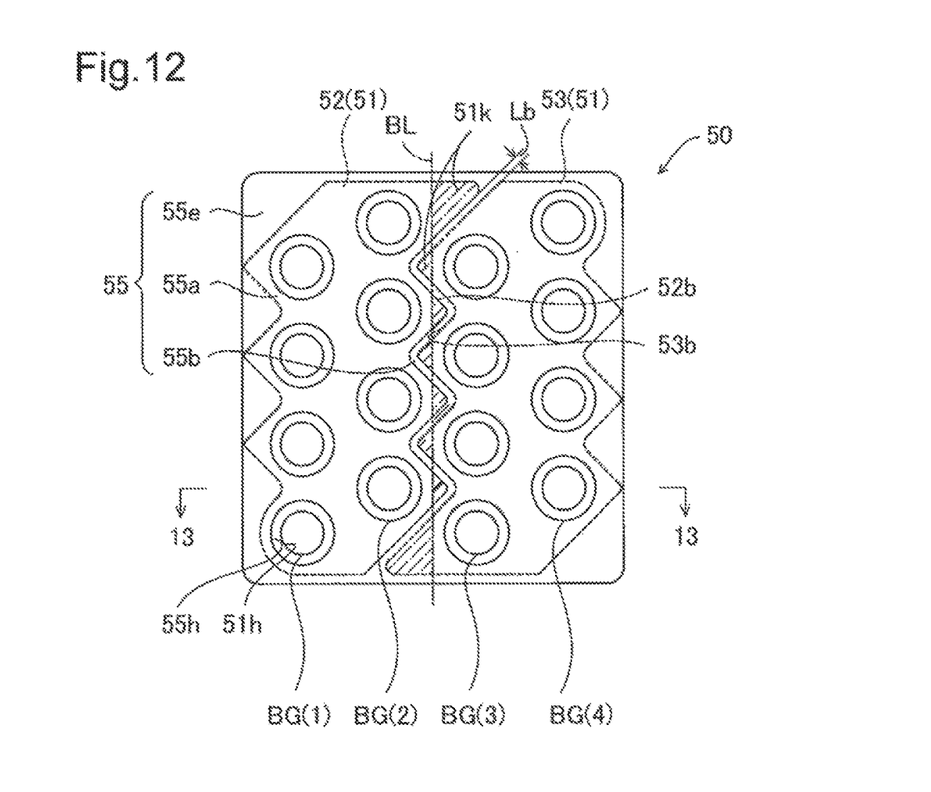
FIG. 12 is a diagram illustrating the second bus bar holding member.
Figure 13:
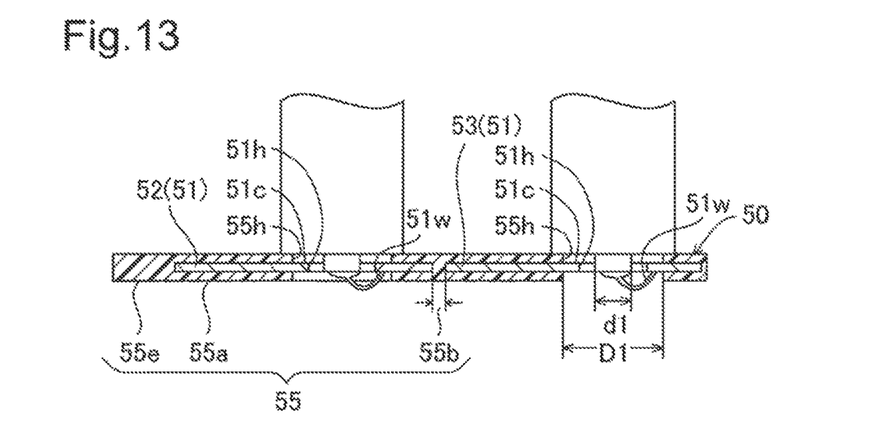
FIG. 13 is a cross sectional view taken on a line 13-13 in FIG. 12.

FIG. 12 is a diagram illustrating the second bus bar holding member 50. The resin support member 55 has a plurality of resin openings 55h formed therein. The respective resin openings 55h are formed concentrically with the terminal openings 51h of the bus bars 51. FIG. 13 is a cross sectional view taken on a line 13-13 in FIG. 12. The resin opening 55h is formed to have an inner diameter D1 larger than an inner diameter d1 of the terminal opening 51h, so that the opening periphery of the terminal opening 51h forms an electrical connection 51c exposed outside. The electrical connection 51c is connected with either the positive terminal Btp or the negative terminal Btn of the battery Bt via a wiring 51w by wire bonding.

Referring to FIG. 12, the resin support member 55 is an integral resin member but is virtually divided, relative to the respective parts of the bus bars 51, into a resin stacking section 55a, a resin intervening section 55b and a resin peripheral section 55e arranged to surround the outer periphery of the bus bars 51. The resin stacking section 55a is stacked on the upper surface and the lower surface of the bus bars 51. The resin intervening section 55b intervenes between the jagged edge 52b of the coupling bus bar 52 and the jagged edge 53b of the coupling bus bar 53 and is made of only the resin material in a wavy pattern of a predetermined width. When a reference line BL is drawn in the array direction between the battery array group BG(2) and the battery array group BG(3) the resin intervening section 55b is formed along a jagged line crossing the reference line BL and is thus formed to be serpentine about the reference line BL.

Part of the jagged edge 52b of the coupling bus bar 52 and part of the jagged edge 53b of the coupling bus bar 53 form protruded areas 51k crossing the reference line BL.

Figure 14:
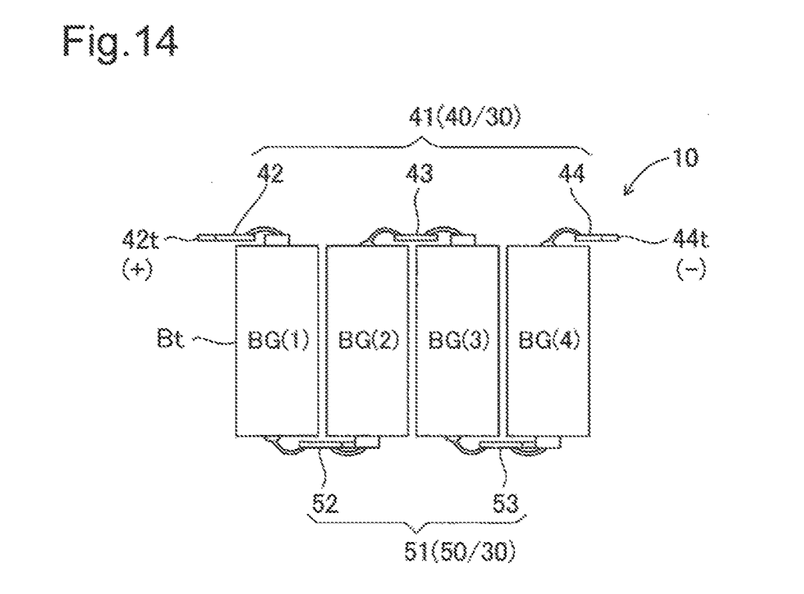
FIG. 14 is a diagram illustrating a plurality of batteries of battery array groups electrically connected by the bus bar holding members.

FIG. 14 is a diagram illustrating the plurality of batteries Bt of the battery array groups BG electrically connected by the bus bar holding members 30. The external terminals of the battery pack 10 or specifically the external terminal 42t (positive) and the external terminal 44t (negative) of the first bus bar holding member 40 are connected with each other by the first bus bar holding member 40 and the second bus bar holding member 50 arranged on the top faces and the bottom faces of the batteries. More specifically, the external terminal 42t is connected with the external terminal 44t via the positive bus bar 42, the respective batteries Bt of the battery array group BG(1), the coupling bus bar 52, the respective batteries Bt of the battery array group BG(2), the coupling bus bar 43, the respective batteries Bt of the battery array group BG(3), the coupling bus bar 53, the respective batteries Bt of the battery array group BG(4) and the negative bus bar 44. The first bus bar holding member 40 and the second bus bar holding member 50 accordingly connect the four batteries Bt in each battery array group BG in parallel and connect the respective battery array groups BG in series.

(3) Functions and Advantageous Effects of Battery Pack 10

The configuration of the above embodiment has the following advantageous effects, in addition to those described above.

The following describes the functions and the advantageous effects of the first bus bar holding member 40. The description on the first bus bar holding member 40 applies to the similar functions and advantageous effects of the second bus bar holding member 50.

(3)-1: As shown in FIG. 14, the first bus bar holding member 40 and the second bus bar holding member 50 have the plurality of bus bars 41 and 51 arranged across the respective batteries of the battery array groups BG, so as to sequentially connect the positive terminals Btp of the batteries Bt in one battery array group and sequentially connect the negative terminals Btn of the batteries Bt in another battery array group. This arrangement connects the respective batteries Bt in each battery array group in parallel, while connecting the batteries Bt of the different battery array groups in series. This facilitates wiring operation of the plurality of batteries Bt.

(3)-2: As shown in FIG. 5, the plurality of bus bars 41 are electrically insulated from each other by the resin support member 45. The resin support member 45 electrically insulates the plurality of bus bars 41 from external members by the resin stacking section 45a stacked on the surfaces of the bus bars 41, while electrically insulating the plurality of bus bars 41 from each other by the resin intervening sections 45b and 45c intervening between the bus bars 41.

(3)-3: The bus bars 41 are embedded in the resin support member 45. This prevents positional misalignment of the bus bars 41.

Figure 15:
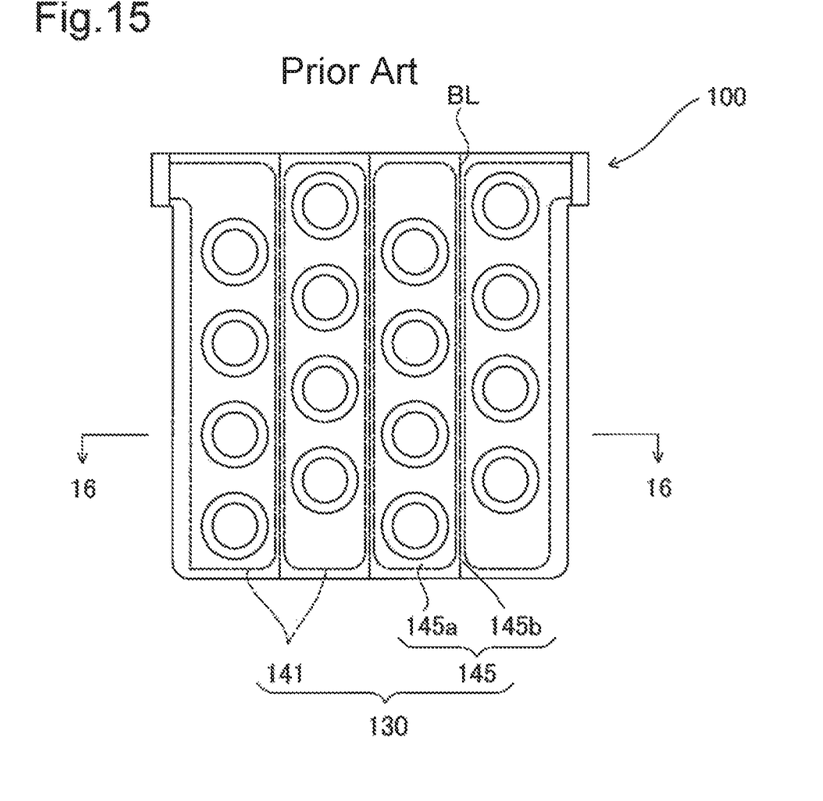
FIG. 15 is a diagram illustrating a battery pack as a comparative example.
Figure 16:
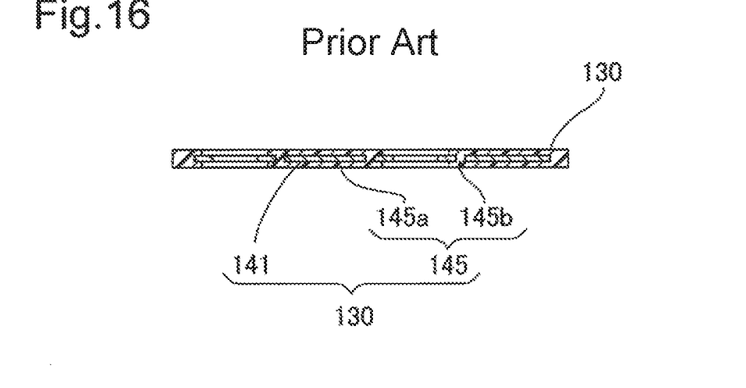
FIG. 16 is a cross sectional view taken on a line 16-16 in FIG. 15.

(3)-4: FIG. 15 is a diagram illustrating a battery pack 100 as a comparative example. FIG. 16 is a cross sectional view taken on a line 16-16 in FIG. 15. Referring to FIG. 15, the battery pack 100 has a bus bar holding member 130. The bus bar holding member 130 includes bus bars 141 respectively connected with four battery array groups and a resin support member 145 in which the bus bars 141 are embedded. The bus bars 141 have linear edges which are parallel to a reference line BL. As shown in FIG. 16, a resin stacking section 145a is stacked on the surfaces of the bus bars 141. A resin intervening section 145b intervenes between the bus bars 141. The resin intervening section 145b has a predetermined width and is parallel to the reference line BL (FIG. 15).

Figure 17:
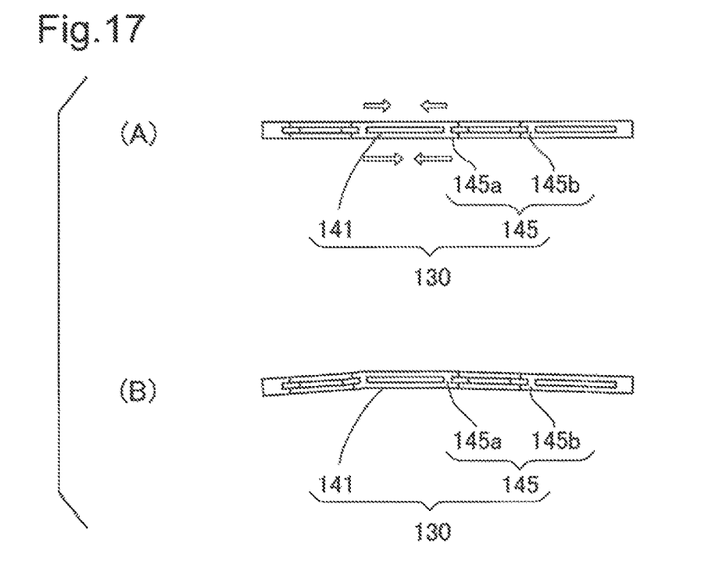
FIG. 17 is diagrams illustrating the functions of a bus bar holding member.

FIG. 17 is diagrams illustrating the functions of the bus bar holding member 130. Referring to FIG. 17(A), the bus bar holding member 130 is produced by injection molding a resin material with the bus bars 141 as insert members. The resin support member 145 is formed by cooling and solidifying the injected melt resin material. The resin material of the resin support member 145 has a significantly different thermal shrinkage from that of the metal material of the bus bars 141. During cooling and solidification of the resin material, the resin stacking section 145a which is in contact with the surfaces of the bus bars 141 is constrained by the bus bars 141. The resin intervening section 145b which is not in contact with the surfaces of the bus bars 141 is, on the other hand, not constrained by the bus bars 141. Accordingly the resin intervening section 145b receives a greater stress than the resin stacking section 145a. When the resin intervening section 145b is arranged parallel to the reference line BL as shown in FIG. 15, variations in wall thickness of the resin stacking section 145a stacked on the upper surface and the lower surface of the bus bars 141 and in mold temperature cause the stress acting on the resin intervening section 145b to be applied in a direction of bending the bus bar holding member 130 from the resin intervening section 145b as the starting point as shown in FIG. 17(B). This force applied in the direction of bending the bus bar holding member 130 causes bending deformation of the bus bar holding member 130, which may interfere with the adequate contact with the battery Bt or assembling of the bus bar holding member 130.

As shown in FIG. 9, on the other hand, the bus bar 41 of the first bus bar holding member 40 according to the embodiment has the base plate 42a on which the resin stacking section 45a is stacked, and the jagged edge 42b formed along an edge of the base plate 42a. The jagged edge 42b is formed in a wavy shape crossing the reference line BL. The jagged edge 42b has the protruded areas 41k crossing the reference line BL. Even when a bending stress is generated from the reference line BL as the starting point, this structure suppresses deformation caused by the stress. The first bus bar holding member 40 is thus unlikely to be bent in the thickness direction.

(3)-5: As shown in FIG. 9, the jagged edges 42b and 43b of the adjacent bus bars 41 are formed in the some wavy shape and are arranged to face each other across a predetermined distance. The resin intervening section 45b is formed in this interval The bus bars 41 can thus be arranged in a narrow area.

(3)-6: As shown in FIG. 5, the resin support member 45 has the resin openings 45h formed to make part of the bus bars 41 exposed outside. The resin openings 45h formed by thinning divide part of the resin stacking section 45a in a direction crossing (at right angle to) the direction of the battery array group (reference line BL). This reduces the stress caused by contraction of the resin material of the resin support member 45 and suppresses deformation of the first bus bar holding member 40.

(3)-7: As shown in FIG. 8, the opening periphery of the terminal opening 41h of the bus bar 41 is exposed outside by the resin opening 45h to form the electrical connection 41c for connection with a battery terminal. This structure facilitates connection with a terminal of the battery Bt.

(4) Other Embodiments

The invention is not limited to the embodiments, examples or modifications described above but may be implemented by various other configurations within the scope of the invention.

Figure 18:
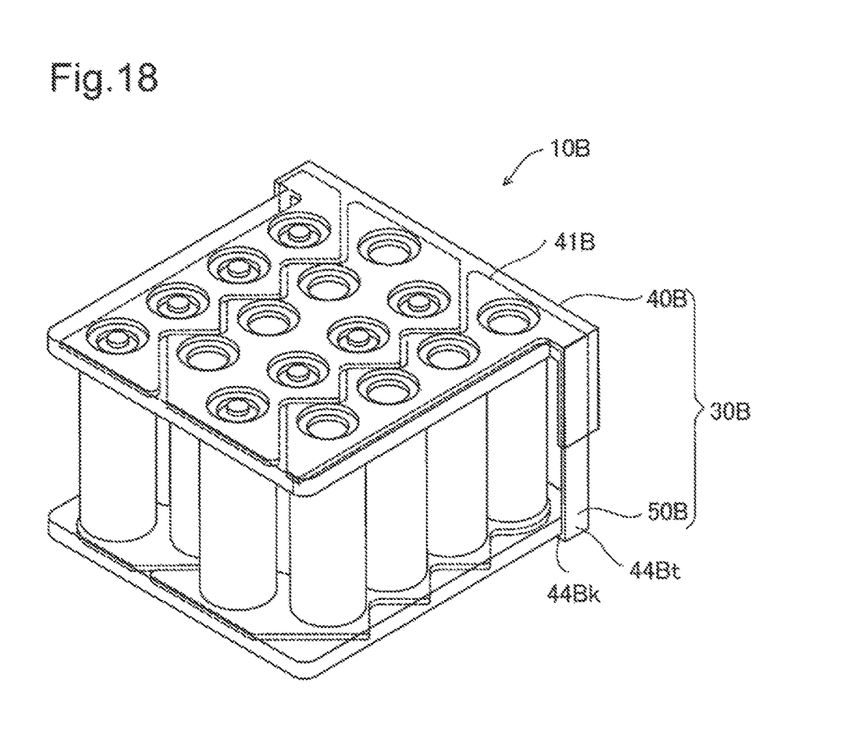
FIG. 18 is a perspective view illustrating a battery pack according to another embodiment.

(4)-1: FIG. 18 is a perspective view illustrating a battery pack 10B according to another embodiment. This embodiment is characterized by the structure of a second bus bar holding member 50B. Bus bar holding members 30B include a first bus bar holding member 40B and a second bus bar holding member 50B. External terminals 44Bt of bus bars 41B of the first bus bar holding member 40B are extended to the lower end of the second bus bar holding member 50B and have engagement elements 44Bk formed by bending respective ends of the external terminals 44Bt, to engage with the second bus bar holding member 50B. This structure integrates the battery pack 10B.

(4)-2: In the embodiment described above, the resin opening 45h is formed at the position where the electrical connection 41c is formed. This is, however, not restrictive. Part of the resin stacking section 45a may be cut out at a position crossing the reference line BL. This further reduces deformation caused by contraction of the resin material of the first bus bar holding member 40.

(4)-3: The above embodiment describes the configuration where a plurality of batteries are arranged in equilateral triangles. This arrangement is, however, not restrictive. The plurality of batteries may be arranged in various configurations, for example, arranged in a lattice pattern or arranged to minimize the interval between the batteries for the purpose of space saving.

(4)-4: The above embodiment, describes the cylindrical batteries. The invention is, however, not restricted to the batteries of this shape but is also applicable to batteries of other shapes such as rectangular batteries or button batteries, as long as the shape does not interfere with the functions and the advantageous effects of the invention.

(4)-5: in the configuration of the above embodiment, the jagged edges formed along the respective edges of the adjacent bus bars are arranged to face each other and engage with each other. This arrangement is, however, not restrictive. One modified configuration may have only one jagged edge formed to cross the reference line.

(4)-6: In the configuration of the above embodiment, the first and second bus bar holding members 40 and 50 are arranged on both ends of the batteries Bt in the axial direction. When the invention is applied to batteries having both positive terminals and negative terminals on one identical end, only one bus bar holding member may be provided and formed in a specific shape corresponding to the positive terminals and the negative terminals. When the bus bar holding member has a plurality of bus bars, the plurality of bus bars may be interconnected by an external wiring.

(5) Other Aspects (5)-1: According to one aspect, there is provided a bus bar holding member configured to connect terminals of respective batteries included in a battery unit in parallel and in series, wherein the battery unit comprises a plurality of battery array groups, each including a plurality of batteries arrayed in an array direction. The bus bar holding member comprises: a plurality of bus bars arranged to connect the terminals of the batteries in each battery array group in parallel; and a resin support member including a resin stacking section which is stacked on at least one surface of the plurality of bus bars, and a resin intervening section which intervenes between the plurality of bus bars to electrically insulate the plurality of bus bars from each other. The bus bar comprises abuse plate on which the resin stacking section is stacked, and a jagged edge formed along an edge of the base plate. The jagged edge is formed in a wavy shape crossing a reference line, which is a straight line along the array direction between an adjacent pair of the battery array groups.

The bus bar holding member is used in association with the battery unit to connect the terminals of the batteries included in the battery unit in parallel and in series. The battery unit has a plurality of battery array groups, each including a plurality of batteries arrayed in an array direction, the resin support member is provided to electrically insulate the plurality of bus bars from each other. More specifically the resin support member electrically insulates the plurality of bus bars from external members by the resin stacking section stacked on at least one surface of the bus bars, while electrically insulating the plurality of bus bars from each other by the resin intervening section intervening between the bus bars. The bus bar has the base plate on which the resin stacking section is stacked, and the jagged edge formed along an edge of the base plate. The jagged edge is formed in a wavy shape crossing the reference line, which is the straight line along the array direction between the adjacent battery array groups. When a bending stress is generated in a direction crossing the reference line, due to a difference between contraction of the resin stacking section and the bus bars, the jagged edge suppresses deformation caused by the bending stress.

(5)-2: In the bus bar holding member of the above aspect, the jagged edge may have a plurality of protruded areas which are arranged in the array direction to cross the reference line.

(5)-3: In the bus bar holding member of the above aspect, two adjacent bus bars may respectively have jagged edges formed in an identical wavy shape and arranged to face each other across a predetermined distance. The resin intervening section may intervene between the jagged edges. According to this embodiment, the plurality of bus bars can be arranged in a narrow area. The respective jagged sections of the adjacent bus bars arranged on both sides of the resin intervening section suppress bending deformation along the reference line.

(5)-4: In the bus bar holding member of the above aspect, the resin stacking section may have a resin opening formed to make part of the bus bar exposed outside. According to this embodiment, the resin stacking section has the resin opening formed to make part of the bus bar exposed outside. The resin stacking section is divided by the resin opening formed in the resin stacking section by thinning. This reduces the stress caused by contraction of the resin support member and suppresses deformation.

(5)-5: In the bus bar holding member of the above aspect, the bus bar may have a terminal opening, which is formed within, the resin opening to have a smaller area than area of the resin opening, and an electrical connection provided in an opening periphery of the terminal opening to be connected with a terminal of the battery. According to this embodiment, the opening periphery of the bus bar is exposed outside via the resin opening and serves as the electrical connection for connecting with a terminal of the battery. This facilitates connection with a terminal of the battery.

(5)-6: According to another aspect, there is provided a battery pack using the bus bar holding member described above. The battery may be a cylindrical battery and may have electrodes provided on respective ends of the battery. A pair of bus bar holding members may be arranged in parallel to each other to be respectively connected with a terminal on one end of the battery and with a terminal on the other end of the battery.

What is claimed is:

1. A bus bar holding member configured to connect terminals of respective batteries included in a battery unit in parallel and in series, wherein the battery unit comprises a plurality of battery array groups, each including a plurality of batteries arrayed in an array direction, the bus bar holding member comprising:
a plurality of bus bars arranged to connect the terminals of the batteries in each battery array group in parallel; and
a resin support member including a resin stacking section which is stacked on at least one surface of the plurality of bus bars, and a resin intervening section which intervenes between the plurality of bus bars to electrically insulate the plurality of bus bars from each other, wherein
each of the plurality of bus bars comprises a base plate on which the resin stacking section is stacked, and a jagged edge formed along an edge of the base plate that is located between adjacent pairs of the plurality of bus bars, the jagged edge is formed in a wavy shape crossing a reference line, which is a straight line along the array direction between an adjacent pair of the battery array groups, wherein each jagged edge of the plurality of bus bars mates with each jagged edge respectively located along the edge of the base plate that is located between the adjacent pairs across a predetermined distance, each jagged edge of the plurality of bus bars is embedded within the resin support member, the resin intervening section is located between each jagged edge of the plurality of bus bars to completely embed each jagged edge, and the resin support member embeds the plurality of bus bars.

2. The bus bar holding member according to claim 1, wherein the jagged edge has a plurality of protruded areas which are arranged in the array direction to cross the reference line.

3. The bus bar holding member according to claim 1, wherein two adjacent bus bars respectively have jagged edges formed in an identical wavy shape and arranged to face each other across a predetermined distance, and the resin intervening section intervenes between the jagged edges.

4. The bus bar holding member according to claim 1, wherein the resin stacking section has a resin opening formed to make part of the bus bar exposed outside.

5. The bus bar holding member according to claim 4, wherein the bus bar has a terminal opening, which is formed within the resin opening to have a smaller area than area of the resin opening, and an electrical connection provided in an opening periphery of the terminal opening to be connected with a terminal of the battery.

6. A battery pack using the bus bar holding member according to claim 1, wherein the battery is a cylindrical battery and has electrodes provided on respective ends of the battery, and a pair of bus bar holding members are arranged in parallel to each other to be respectively connected with a terminal on one end of the battery and with a terminal on the other end of the battery.

7. The battery pack according to claim 1, wherein the jagged edge separates the adjacent pairs of the plurality of bus bars.

8. The battery pack according to claim 1, wherein each jagged edge of the plurality of bus bars interlocks with each jagged edge respectively located along the edge of the base plate that is located between the adjacent pairs across a predetermined distance.

9. The battery pack according to claim 1, wherein the resin intervening section is located between, and connects, each of the plurality of bus bars.

10. The battery pack according to claim 1, wherein each of the plurality of bus bars includes terminal openings and at least one gap that separates each of the plurality of bus bars, each jagged edge of the plurality of bus bars extends between the terminal openings and along the at least one gap without intersecting the terminal openings.

11. The battery pack according to claim 10, wherein the plurality of bus bars each have opposing peripheral edges, and each jagged edge of the plurality of bus bars intersects the opposing peripheral edges of the plurality of bus bars and connects the opposing peripheral edges.

\* \* \* \* \*